Oct. 30, 1928.  
K. DAVIS  
CABLE DRIVING MECHANISM  
Filed July 5, 1924  
1,689,996
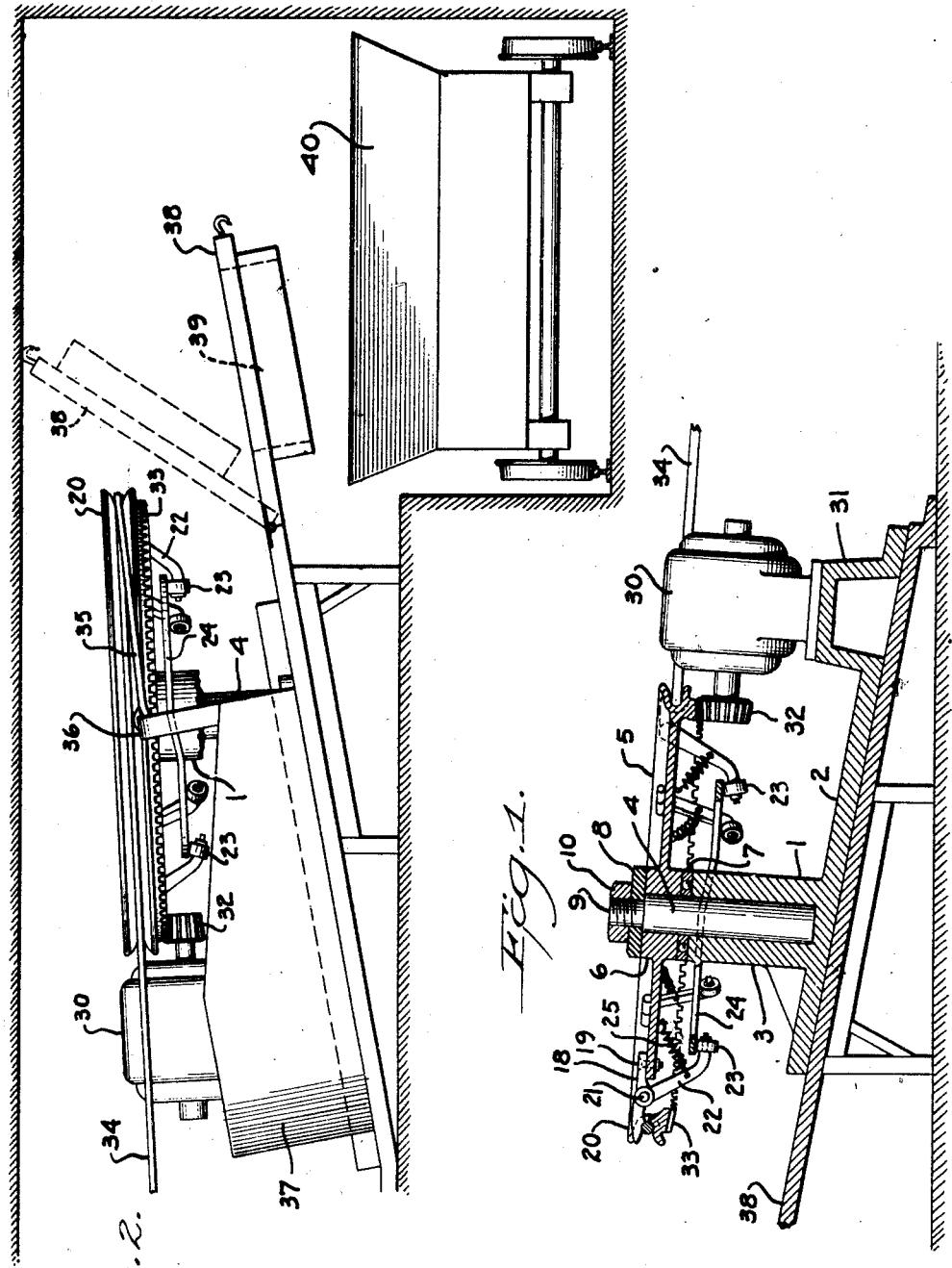
INVENTOR  
K. Davis  
BY John D. Morgan  
ATTORNEY Patented Oct. 30, 1928.

1,689,996

UNITED STATES PATENT OFFICE.

KENNETH DAVIS, OF ST. BENEDICT, PENNSYLVANIA, ASSIGNOR TO REMBRANDT PEALE, RICHARD PEALE, AND REMBRANDT PEALE, JUNIOR, TRUSTEES, ALL OF ST. BENEDICT, PENNSYLVANIA.

CABLE-DRIVING MECHANISM.

Application filed July 5, 1924. Serial No. 724,337.

The invention relates to a cable driving mechanism, and more especially to such a mechanism for positively driving an endless cable.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

In the drawings:—

Fig. 1 is a central vertical section through the mechanism embodying the invention; and Fig. 2 is a side elevation, looking in the opposite direction, of the mechanism shown in Fig. 1.

This application is directed to subject matter disclosed in my application Ser. No. 266,505, filed December 12, 1918, which eventuated in Patent No. 1,467,845, dated September 11, 1923.

In the original application, the mechanism is shown applied to a mechanism for automatically conveying coal in a coal mine by means of a series of bottomless scrapers dragged along by stagings or lead-lines attached to an endless cable driven by the mechanism claimed in the present application. However, it will be clear that the mechanism covered by the present application is susceptible of general use in providing a positive drive for endless cables, and possibly for other uses.

The preferred embodiment of the invention comprises generally a sheave, suitably mounted on a shaft, and having means for gripping or pressing the endless cable to the sheave to prevent slippage and to insure a positive drive. This is effected in the present embodiment by a series of automatically-operating cable gripping members or fingers, carried by the sheave, and which are controlled by spring and cam devices for causing the fingers to grip the cable and then to release it.

Also, in this preferred embodiment there is a direct drive by motor upon the sheave, although obviously the drive could be varied as desired.

Referring now in detail to the embodiment, illustrated by way of example in the accompanying drawings, a pedestal 1 is provided comprising a bed plate 2 and an upwardly-extending column 3, a stub shaft 4 being mounted within the column.

A sheave 5 is journaled loosely on the shaft 4, and the wheel hub 6 has its lower flat face running on a ball bearing 7, which bearing is supported upon the top face of the column 3. The sheave 5 is held in place on the shaft 4 by suitable means, such as a friction washer 8, which encircles a reduced, screw-threaded end 9 of the shaft 4, and is supported upon the shouldered part, formed by the reduction of the shaft, thereby preventing undue pressure and friction on the hub of the sheave. A nut 10 is screwed onto the threaded top 9 of the shaft 4 to hold the sheave and washer in position.

The embodied form of automatically-operating cable gripping and releasing means comprises a series of spring and cam-operated cable-clamping fingers 20, pivotally mounted at 21 upon supporting brackets 18, which are fastened upon the body of the sheave by bolts 19. The fingers 20 are formed as levers, the tails 22 thereof extending downwardly and inwardly and carrying at their inner ends, respectively, cam rollers 23.

These cam rollers run on the underside of a cam-track 24, located beneath the sheave and carried by the column 3. Helical tension springs 25 impel the cam rollers 23 against the cam track 24. Thus, as the sheave rotates, the cam fingers, during the idle part of their travel, are held by their rollers 23 and cam-ring 24 in the open position, against the action of their respective springs 25. When any particular clamping finger, by the rotation of the sheave, comes into the active, or clamping, position with respect to the cable, the cam track permits the corresponding spring 25 to force the finger 20 into clamping engagement with the sheave and to hold it in such engagement during approximately a half revolution of the sheave.

When the finger comes to the place where the cable leaves the sheave, the cam track 24 will again operate to open the clamping finger, and thus release its grip upon the cable. It will be noted from the drawing that the sheave is provided with a sufficient number of the clamping fingers so that a plurality thereof are simultaneously and continuously in gripping engagement with the cable.

In accordance with one feature of the invention, as already indicated, a direct drive upon the sheave is provided. As embodied, a motor 30 is mounted on a base 31, which is preferably integral with the bed 2 of the supporting frame of the sheave. On the shaft of the motor is a pinion 32, meshing directly with a crown gear ring 33, formed on the side face of the sheave. It will be obvious that these parts may be proportioned so that this direct drive, without the use of belts or reduction gears, can be economically and efficiently applied.

The drawings illustrating application of the present invention to an endless scraper line for conveying coal, are reproduced from the parent application. The cable 34 is shown running around the sheave, and having stagings or lead lines 35 connected to the bails 36 of the bottomless scrapers 37. At the outer end of their run, the scrapers pass over the elevated and inclined platform 38, having the discharge opening 39 therein. As the bottomless scrapers pass over the opening 39, the coal drops into the car 40.

The invention in its broader aspects is not limited to the specific mechanisms shown and described but departures may be made therefrom within the scope of the accompanying claims without departing from the principles of the invention and without sacrificing its chief advantages.

What I claim is:—

1. In a cable driving mechanism in combination a rotatable sheave about which the cable runs having a central supporting web, a plurality of cable gripping levers pivoted to the central web, an actuating arm on each lever inclined inwardly away from the pivot, spring means fixed to the web and to the actuating arms for impelling the levers to gripping position, cam rollers on the actuating arms, and a stationary cam track, cooperating with the rollers for controlling the gripping movements of the levers.

2. In a cable driving mechanism in combination a rotatable sheave about which the cable runs having a central supporting web, a plurality of cable gripping levers pivoted to the central web, an actuating arm on each lever inclined inwardly away from the pivot, spring means fixed to the web and to the actuating arms for impelling the levers to gripping position, cam rollers on the actuating arms, and a stationary cam track in constant engagement with the rollers for controlling the gripping movements of the levers.

In testimony whereof, I have signed my name to this specification.

KENNETH DAVIS.